(12) United States Patent
Hirata et al.

(10) Patent No.: US 10,814,788 B2
(45) Date of Patent: Oct. 27, 2020

(54) RECOGNIZED-REGION ESTIMATION DEVICE, RECOGNIZED-REGION ESTIMATION METHOD, AND RECOGNIZED-REGION ESTIMATION PROGRAM

(71) Applicant: Mitsubishi Electric Corporation, Tokyo (JP)

(72) Inventors: Takahisa Hirata, Tokyo (JP); Takashi Hirano, Tokyo (JP); Takuji Morimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 51 days.

(21) Appl. No.: 16/304,904

(22) PCT Filed: Jul. 5, 2016

(86) PCT No.: PCT/JP2016/069890
§ 371 (c)(1),
(2) Date: Nov. 27, 2018

(87) PCT Pub. No.: WO2018/008085
PCT Pub. Date: Jan. 11, 2018

(65) Prior Publication Data
US 2019/0275946 A1 Sep. 12, 2019

(51) Int. Cl.
*B60R 1/12* (2006.01)
*B60W 40/10* (2012.01)
(Continued)

(52) U.S. Cl.
CPC ............... *B60R 1/12* (2013.01); *B60R 1/00* (2013.01); *B60R 1/06* (2013.01); *B60W 40/10* (2013.01);
(Continued)

(58) Field of Classification Search
CPC ............. B60R 1/00; B60R 2001/1253; B60R 2300/202; B60R 2300/802;
(Continued)

(56) References Cited

U.S. PATENT DOCUMENTS 9,123,252 B2 * 9/2015 Nagata ............... B60W 30/0953
2009/0237644 A1 * 9/2009 Uechi ................... B60W 30/10
356/29

(Continued)

FOREIGN PATENT DOCUMENTS

JP 10-185597 A 7/1998
JP 2010-179713 A 8/2010
(Continued)

OTHER PUBLICATIONS

International Search Report isseud in PCT/JP2016/069890 (PCT/ISA/210), dated Oct. 11, 2016.

*Primary Examiner* — Michael J Zanelli
(74) *Attorney, Agent, or Firm* — Birch, Stewart, Kolasch & Birch, LLP

(57) ABSTRACT

A recognized-region estimation device is provided with a visually-recognized-region calculating unit which calculates a visually-recognized region visually recognized by a driver of a mobile body in a mobile body coordinate system based on the mobile body on the basis of a line-of-sight direction of the driver, and a recognized-region calculating unit which calculates a recognized region recognized by the driver in the mobile body coordinate system on the basis of the visually-recognized region calculated by the visually-recognized-region calculating unit.

18 Claims, 9 Drawing Sheets

(51) Int. Cl.
 *B60W 50/00* (2006.01)
 *B60R 1/00* (2006.01)
 *G08G 1/16* (2006.01)
 *B60R 1/06* (2006.01)

(52) U.S. Cl.
 CPC ........... *B60W 50/0097* (2013.01); *G08G 1/16* (2013.01); *B60R 2001/1253* (2013.01); *B60R 2300/202* (2013.01); *B60R 2300/802* (2013.01); *B60R 2300/8093* (2013.01)

(58) Field of Classification Search
 CPC . B60R 2300/8093; G08G 1/16; B60W 40/10; B60W 50/0097
 See application file for complete search history.

(56) References Cited

U.S. PATENT DOCUMENTS

2012/0046857 A1     2/2012  Mori et al.
2013/0083197 A1*    4/2013  Yamakage ............... H04N 7/18
                                                      348/148

FOREIGN PATENT DOCUMENTS

| JP | 2012-14257 A | 1/2012 |
| JP | 2012-234409 | * 11/2012 |
| JP | 2016-170688 | * 9/2016 |
| WO | WO 2010/131331 A1 | 11/2010 |

* cited by examiner

RECOGNIZED-REGION ESTIMATION DEVICE, RECOGNIZED-REGION ESTIMATION METHOD, AND RECOGNIZED-REGION ESTIMATION PROGRAM

TECHNICAL FIELD

The present invention relates to a recognized-region estimation device, a recognized-region estimation method, and a recognized-region estimation program for estimating a surrounding recognizing status of a driver in a mobile body such as an automobile.

BACKGROUND ART

In automobiles and the like, with recent popularization of a driving assist function, popularization of sensors for monitoring surroundings of a host vehicle such as a radar and a camera is progressing. Also, it is expected that advancement and popularization of automated driving function progress in the near future, and it is expected that the sensors which monitor the surroundings of the host vehicle further are facilitated in both quality and quantity in the future.

On the other hand, in a situation other than a completely automated driving state, it is expected that the driver and the vehicle cooperate to perform a driving behavior. Therefore, in the driving assist function and the automated driving function, it is desired to estimate the surrounding recognizing status of the driver and cooperatively utilize the same and the surrounding recognizing status of the vehicle.

For example, in a situation in which a vehicle temporarily stops within an intersection and waits for a crossing person, when the sensors which monitor the surroundings of the host vehicle detect approach of the crossing person to the host vehicle, it is bothersome in general to warn the driver of such situation from the vehicle one by one, which in turn breaks concentration of the driver. However, when the driver is not aware of the approach of the crossing person, warning the driver and calling attention may contribute to safe driving. As another example, in a vehicle in a semi-automated driving state, it is required that the driver be in a state of grasping the situation around and respond instantaneously even when control of the vehicle is automated, so that it is necessary that the vehicle stop the automated driving when determining that the driver fails to recognize the surrounding.

As a conventional technology of estimating the surrounding recognizing status of the driver in the mobile body, there is the technology disclosed in Patent Literature 1, for example. Patent Literature 1 discloses a method of estimating a visually-recognized region around a vehicle by a driver by superimposing a visual field estimated from a line-of-sight direction of the driver on a map.

CITATION LIST

Patent Literatures

Patent Literature 1: JP 2010-179713 A

SUMMARY OF INVENTION

Technical Problem

A visual field estimating device according to Patent Literature 1 projects the visual field estimated from a line-of-sight direction of the driver on a coordinate system fixed on a map space (hereinafter referred to as a map coordinate system) using information of a global positioning system (GPS) and the like. The GPS has a characteristic that accuracy of measurement of a host vehicle position is deteriorated or the measurement becomes impossible when a radio wave condition is not excellent, for example, in a tunnel or urban canyons. Estimating accuracy of the surrounding recognizing status of the driver depends on robustness of the host vehicle position measurement by the GPS, so that under a circumstance where an accurate host vehicle position in the map coordinate system cannot be obtained, estimation of the surrounding recognizing status of the driver is difficult.

In addition, sensors mounted on the vehicle in Patent Literature 1 monitor surroundings in a coordinate system centered on the host vehicle (hereinafter referred to as a host vehicle coordinate system). Therefore, when the sensors mounted on the vehicle and the visual field estimating device according to Patent Literature 1 cooperate with each other to estimate the surrounding recognizing statue of the driver, it is required to convert the surrounding recognizing status of the driver estimated on the map coordinate system fixed on the map space to the host vehicle coordinate system on the basis of a position and an attitude of the host vehicle in the map coordinate system. Therefore, a calculation cost for coordinate conversion occurs.

As described above, in the conventional technology for estimating the surrounding recognizing status of the driver in the mobile body, since it is not easy for the visual field estimating device to cooperate with the sensors mounted on the mobile body, there is a problem in that the surrounding recognizing status of the driver cannot be efficiently estimated.

The present invention is achieved for solving the above-described problem and an object thereof is to facilitate cooperation with sensors mounted on a mobile body.

Solution to Problem

A recognized-region estimation device according to the present invention is provided with a visually-recognized-region calculator to calculate a visually-recognized region visually recognized by a driver of a mobile body in a mobile body coordinate system based on the mobile body on the basis of a line-of-sight direction of the driver, a recognized-region calculator to calculate a recognized region recognized by the driver in the mobile body coordinate system on the basis of the visually-recognized region calculated by the visually-recognized-region calculator, and a movement amount measurer to measure a movement amount per unit time of the mobile body in the mobile body coordinate system, in which the recognized-region calculator moves the recognized region calculated prior to one unit time on a basis of the movement amount per unit time measured by the movement amount measurer and updates the recognized region by adding the visually-recognized region calculated by the visually-recognized-region calculator to the moved recognized region.

Advantageous Effects of Invention

According to the present invention, since the visually-recognized region and the recognized region in the mobile body coordinate system based on the mobile body are calculated, cooperation with sensors mounted on the mobile body becomes easy. This makes it possible to efficiently estimate the surrounding recognizing status of the driver.

DESCRIPTION OF EMBODIMENTS

Figure 1:
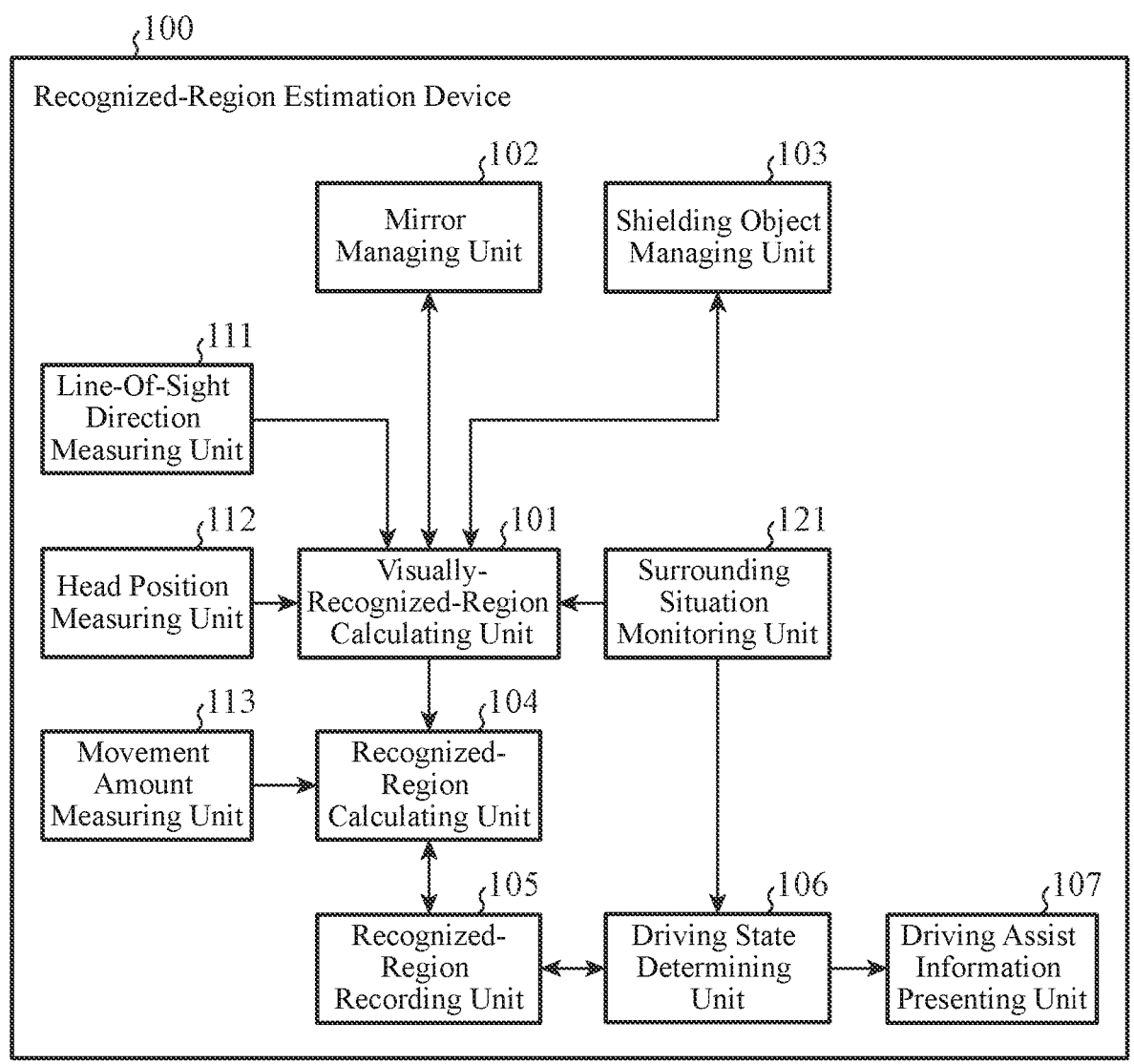
FIG. 1 is a functional block diagram illustrating a configuration example of a recognized-region estimation device according to a first embodiment of the present invention.

A mode for carrying out the present invention is hereinafter described with reference to the attached drawings in order to describe the present invention in more detail.
First Embodiment FIG. 1 is a functional block diagram illustrating a configuration example of a recognized-region estimation device 100 according to a first embodiment of the present invention. The recognized-region estimation device 100 is mounted on a mobile body for estimating a situation around the mobile body recognized by a driver of the mobile body. In the following description, a vehicle is taken as an example of the mobile body, but the mobile body may also be a railroad, a ship, an aircraft and the like.

The recognized-region estimation device 100 illustrated in FIG. 1 is provided with a visually-recognized-region calculating unit 101, a mirror managing unit 102, a shielding object managing unit 103, a recognized-region calculating unit 104, a recognized-region recording unit 105, a driving state determining unit 106, a driving assist information presenting unit 107, a line-of-sight direction measuring unit 111, a head position measuring unit 112, a movement amount measuring unit 113, and a surrounding situation monitoring unit 121. Note that, as is to be hereinafter described in detail, indispensable components of the recognized-region estimation device 100 are the visually-recognized-region calculating unit 101 and the recognized-region calculating unit 104, and it does not matter whether the recognized-region estimation device 100 includes other components or not.

Figure 2:
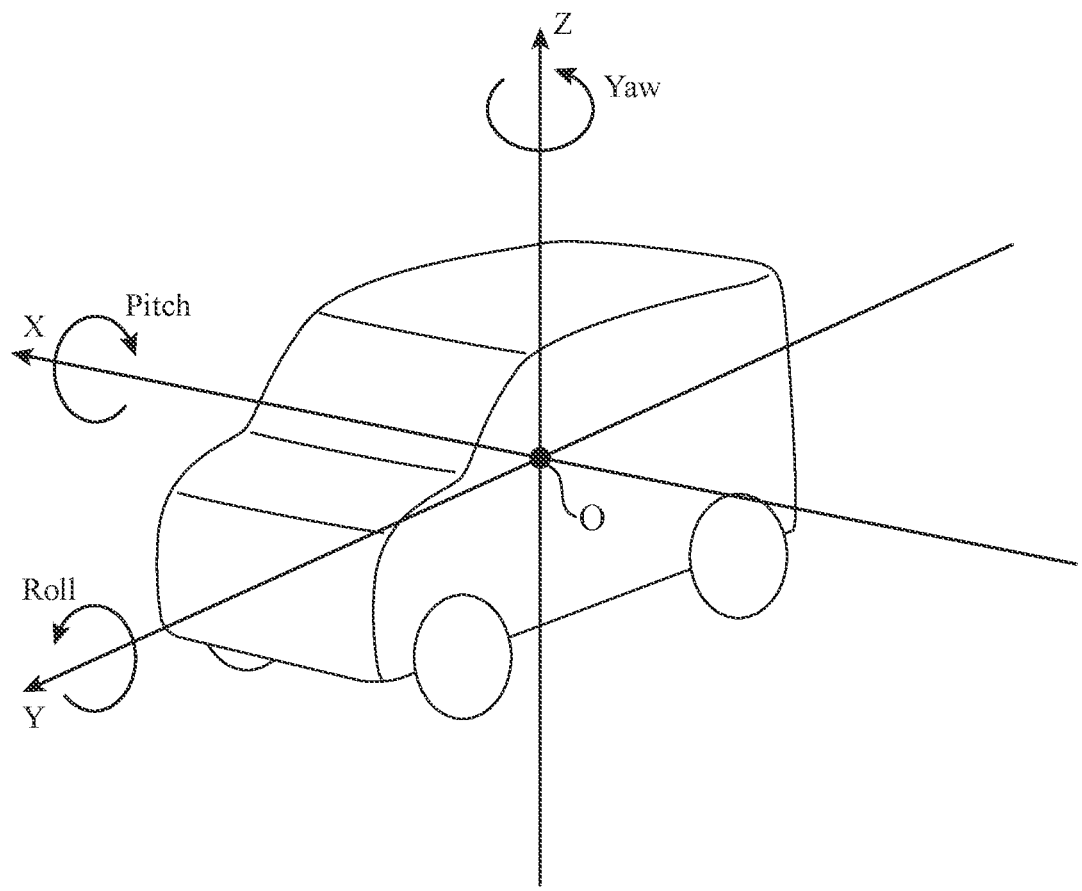
FIG. 2 is a view illustrating a mobile body coordinate system in the recognized-region estimation device according to the first embodiment.

FIG. 2 is a view for illustrating a mobile body coordinate system based on the mobile body. As coordinate axes in the mobile body coordinate system, an axis whose upward vertical direction is positive is referred to as a Z axis, an axis which regards as positive a front part of the mobile body in a plane orthogonal to the Z axis is referred to as a Y axis, and an axis whose right direction is positive, the axis being orthogonal to the Y axis in this plane is referred to as an X axis. Also, rotation around the X axis is referred to as a pitch, rotation around the Y axis is referred to as a roll, and rotation around the Z axis is referred to as yaw; each rotation is positive in a direction of right screw rotation with respect to the positive direction of the rotation axis. An origin O of the mobile body coordinate system is a freely-selected point relatively fixed with respect to the mobile body.

Note that, in the first embodiment, in order to simplify the description, an embodiment using only three axes of the X axis, Y axis, and yaw as a minimum configuration is described. It is obvious that an embodiment using a combination of other axes and an embodiment using up to six axes of the X axis, Y axis, Z axis, pitch, roll, and yaw may be implemented by the configuration similar to that of this embodiment.

Figure 3:
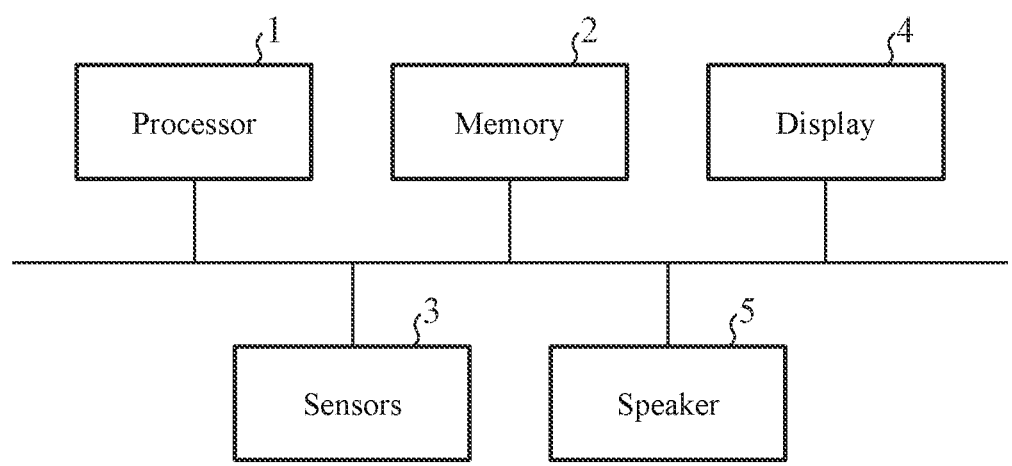
FIG. 3 is a hardware configuration diagram of the recognized-region estimation device according to the first embodiment.

FIG. 3 is an example of a hardware configuration diagram of the recognized-region estimation device 100 according to the first embodiment.

The line-of-sight direction measuring unit 111, the head position measuring unit 112, the movement amount measuring unit 113, and the surrounding situation monitoring unit 121 in the recognized-region estimation device 100 are sensors 3. The sensors 3 are a camera, an acceleration sensor, a gyroscope, a radar or the like. The sensors 3 may be included in the recognized-region estimation device 100, or existing ones mounted on the vehicle may be used.

The driving assist information presenting unit 107 in the recognized-region estimation device 100 is at least either a display 4 or a speaker 5. The display 4 and the speaker 5 may be included in the recognized-region estimation device 100, or existing ones mounted on the vehicle may be used.

The mirror managing unit 102, the shielding object managing unit 103, and the recognized-region recording unit 105 in the recognized-region estimation device 100 are a memory 2.

Functions of the visually-recognized-region calculating unit 101, the recognized-region calculating unit 104, and the driving state determining unit 106 in the recognized-region estimation device 100 are implemented by software, firmware, or a combination of the software and firmware. The software or firmware is described as a program and stored in the memory 2. A processor 1 implements the functions of the respective units by reading out and executing the program stored in the memory 2. That is, the recognized-region estimation device 100 is provided with the memory 2 for storing the program which eventually executes each step illustrated in FIG. 4 to be described later when being executed by the processor 1. It may also be said that the program allows a computer to execute a procedure or a method of each of the visually-recognized-region calculating unit 101, the recognized-region calculating unit 104, and the driving state determining unit 106.

The processor 1 is also referred to as a central processing unit (CPU), a processing unit, an arithmetic device, a microprocessor, a microcomputer, a digital signal processor (DSP) or the like.

The memory 2 may be, for example, a nonvolatile or volatile semiconductor memory such as a random access memory (RAM), a read only memory (ROM), an erasable programmable ROM (EPROM), a flash memory, and a solid state drive (SSD), a magnetic disk such as a hard disk and a flexible disk, or may be an optical disk such as a compact disc (CD) and a digital versatile disc (DVD).

Note that, some of the functions of the visually-recognized-region calculating unit 101, the recognized-region calculating unit 104, and the driving state determining unit 106 may be implemented by dedicated hardware and some of them may be implemented by the software or firmware. The dedicated hardware is, for example, a single circuit, a composite circuit, a programmed processor, a parallel-programmed processor, an application-specific integrated circuit (ASIC), a field-programmable gate array (FPGA), a processing circuit obtained by combining them or the like. As described above, the recognized-region estimation device 100 may implement the functions of the visually-recognized-region calculating unit 101, the recognized-region calculating unit 104, and the driving state determining unit 106 by the hardware, software, firmware, or the combination thereof.

Next, the recognized-region estimation device 100 is described in detail.

The line-of-sight direction measuring unit 111 obtains a camera image from a camera which monitors the driver of the vehicle which is the mobile body. Then, the line-of-sight direction measuring unit 111 measures a line-of-sight direction of the driver in the mobile body coordinate system by a known technology of estimating the line-of-sight direction of the driver from the camera image and the like. Herein, as the line-of-sight direction, it is assumed that at least the line-of-sight direction in the yaw direction is measured with the positive direction of the Y axis in the mobile body coordinate system as the origin. It is desirable that information for distinguishing a visually-recognizing state such as an opening/closing state of the eyelid of the driver be measured together. The line-of-sight direction measuring unit 111 outputs the measured information on the line-of-sight direction to the visually-recognized-region calculating unit 101.

The head position measuring unit 112 obtains the camera image from the camera which monitors the driver. Then, the head position measuring unit 112 measures a head position of the driver in the mobile body coordinate system by a known technology of estimating the head position of the driver from the camera image and the like. Herein, it is assumed that positions in the X, Y, and Z axes in the mobile body coordinate system are measured as the head position. Note that, although it is desirable that the head position measuring unit 112 measure the head position at every moment, it is also possible to simply use a static value assumed from a position of a head rest of a driver's seat or an attribute and the like of the driver set in advance. For example, the head position measuring unit 112 may use a standard head position assumed when the vehicle is designed, or a head position calculated from a seat surface position, a back rest angle or the like. Furthermore, the head position measuring unit 112 may also record physical information such as a body height for each driver in advance and estimate the head position on the basis of the physical information of the driver on board. The head position measuring unit 112 outputs information on the measured head position to the visually-recognized-region calculating unit 101.

The movement amount measuring unit 113 obtains inertia information such as acceleration or a speed from the acceleration sensor, a gyro sensor or the like. The movement amount measuring unit 113 measures a movement amount of the vehicle per unit time in the mobile body coordinate system from the obtained inertia information. Herein, the movement amount is measured for at least the total of three axes of the X axis, Y axis, and yaw out of the movement amounts in the X, Y, and Z directions and rotational amounts around the three axes of the yaw, pitch, and roll in the mobile body coordinate system. Note that, the movement amount measuring unit 113 may measure the movement amount of the vehicle per unit time in the mobile body coordinate system by using a vehicle exterior system such as a GPS in place of the acceleration sensor, the gyro sensor or the like. Position information of the mobile body necessary for estimating the visually-recognized region and the recognized region is only a relative movement amount per unit time of the vehicle. Therefore, even when the position information used by the movement amount measuring unit 113 for measuring the movement amount is the position information of a map coordinate system measured by the GPS and the like or the position information of the mobile body coordinate system measured by the acceleration sensor and the like, the movement amount which is a difference amount per unit time is the same value, so that coordinate conversion is eliminated, and there is no calculation cost. However, the acceleration sensors or the like is more robust than the GPS and is preferable. The movement amount measuring unit 113 outputs information on the measured movement amount to the recognized-region calculating unit 104.

Note that, in FIG. 1, it is configured such that the line-of-sight direction measuring unit 111, the head position measuring unit 112, and the movement amount measuring unit 113 of the recognized-region estimation device 100 measure the line-of-sight direction, the head position, and the movement amount, respectively; however, configuration is not limited to this. For example, the recognized-region estimation device 100 may also be configured to obtain the line-of-sight direction, the head position, and the movement amount measured by an external device without including the line-of-sight direction measuring unit 111, the head position measuring unit 112, and the movement amount measuring unit 113 provided.

The surrounding situation monitoring unit 121 obtains detected values from the radar, the camera or the like. The surrounding situation monitoring unit 121 detects an obstacle, a hazardous object or the like around the vehicle on the basis of the detected value, and outputs the same to the visually-recognized-region calculating unit 101 and the driving state determining unit 106 as information indicating a situation around the vehicle. The surrounding situation monitoring unit 121 may also measure information affecting the visually-recognizing state such as brightness or weather together, and output this information to the visually-recognized-region calculating unit 101 and the driving state determining unit 106 together with the information indicating the situation around the vehicle.

Note that, in FIG. 1, it is configured such that the recognized-region estimation device 100 is provided with the surrounding situation monitoring unit 121, but this is not necessarily provided.

The visually-recognized-region calculating unit 101 calculates the visually-recognized region in the mobile body coordinate system by using the information on the line-of-sight direction received from the line-of-sight direction measuring unit 111. The visually-recognized region is a region around the vehicle estimated to be visually recognized by the driver. When calculating the visually-recognized region, the visually-recognized-region calculating unit 101 uses as necessary the information on the head position received from the head position measuring unit 112, information on the mirrors managed by the mirror managing unit 102, information on the shielding object managed by the shielding object managing unit 103, and the information indicating the situation around the vehicle received from the surrounding situation monitoring unit 121. The visually-recognized-region calculating unit 101 outputs information on the visually-recognized region to the recognized-region calculating unit 104.

The mirror managing unit 102 manages the information on the mirrors mounted on the vehicle. Herein, the mirrors are physical mirrors such as a sideview mirror and a rear-view mirror, and electronic mirrors such as a camera monitor screen. The mirror managing unit 102 manages information indicating installation positions, shapes and the like of these mirrors and information on a projected region projected by these mirrors in the mobile body coordinate system. It is desirable that the projected region be a representative visually-recognized region projected by the mirrors in the mobile body coordinate system. For example, in a case of the physical mirrors, the visually-recognized region obtained when the driver gazes at a central portion of the physical mirror installed in a standard state is set as the projected region. Also, in a case of the electronic mirrors, the visually-recognized region obtained when a central portion is gazed for each display mode of the electronic mirror is set as the projected region. The display mode of the electronic mirror is, for example, a wide angle mode with a wide angle of view, a telephoto mode with a narrow angle of view and the like, and the region projected on the electronic mirror varies depending on the display mode. The mirror managing unit 102 outputs the information on the mirrors to the visually-recognized-region calculating unit 101.

The shielding object managing unit 103 manages the information on the shielding object mounted on the vehicle. Herein, the shielding object blocks a view of the driver such as a pillar and a hood. The shielding object managing unit 103 manages information indicating installation positions, shapes and the like of these shielding objects in the mobile body coordinate system. The shielding object managing unit 103 outputs the information on the shielding object to the visually-recognized-region calculating unit 101.

Note that, although the recognized-region estimation device 100 is provided with the mirror managing unit 102 and the shielding object managing unit 103 in FIG. 1, it is not always necessary to provide the same.

The recognized-region calculating unit 104 calculates a newest recognized region in the mobile body coordinate system by using the information on the movement amount received from the movement amount measuring unit 113, the information on the visually-recognized region received from the visually-recognized-region calculating unit 101, and information on a past recognized region recorded in the recognized-region recording unit 105. The recognized region is a region around the vehicle estimated to be recognized by the driver. The recognized-region calculating unit 104 outputs information on the recognized region to the recognized-region recording unit 105.

The recognized-region recording unit 105 records the information on the recognized region received from the recognized-region calculating unit 104. Also, the recognized-region recording unit 105 outputs the recorded information on the recognized region to the recognized-region calculating unit 104 and the driving state determining unit 106.

The driving state determining unit 106 determines the driving state of the vehicle by using the information on the recognized region recorded by the recognized-region recording unit 105 and the information indicating the situation around the vehicle received from the surrounding situation monitoring unit 121. The driving state determining unit 106 outputs the information on the driving state to the driving assist information presenting unit 107.

The driving assist information presenting unit 107 generates information to call attention of the driver or information to assist driving of the driver using the information of the driving state received from the driving state determining unit 106 and presents the same. A method of presenting the information is display on the display 4, audio output from the speaker 5 or the like.

Note that, although the recognized-region estimation device 100 is provided with the driving state determining unit 106 and the driving assist information presenting unit 107 in FIG. 1, it is not always necessary to provide the same. Especially, in vehicles and the like, there is a case where functions of the driving state determining unit 106 and the driving assist information presenting unit 107 are provided by known means such as a driving assist device or an automated driving device. Therefore, the recognized-region estimation device 100 may be configured to use the driving assist device and the like being an external device without including the driving state determining unit 106 and the driving assist information presenting unit 107.

Next, operation of the recognized-region estimation device 100 is described.

Figure 4:
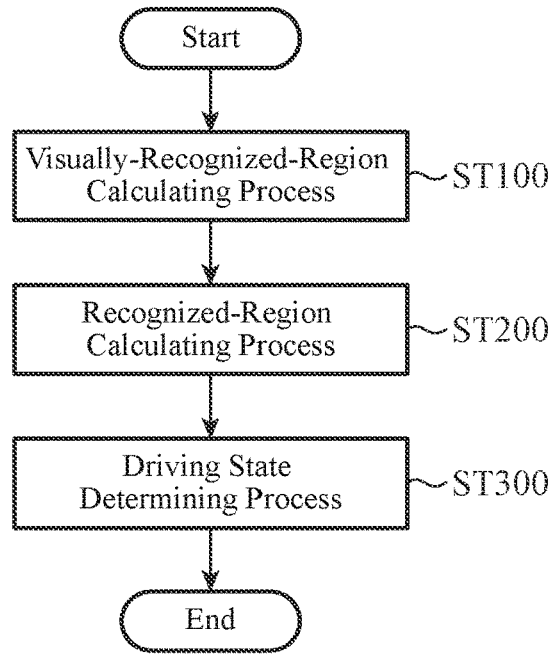
FIG. 4 is a flowchart illustrating operation of the recognized-region estimation device according to the first embodiment.

FIG. 4 is a flowchart illustrating the operation of the recognized-region estimation device 100 according to the first embodiment.

Figure 5:
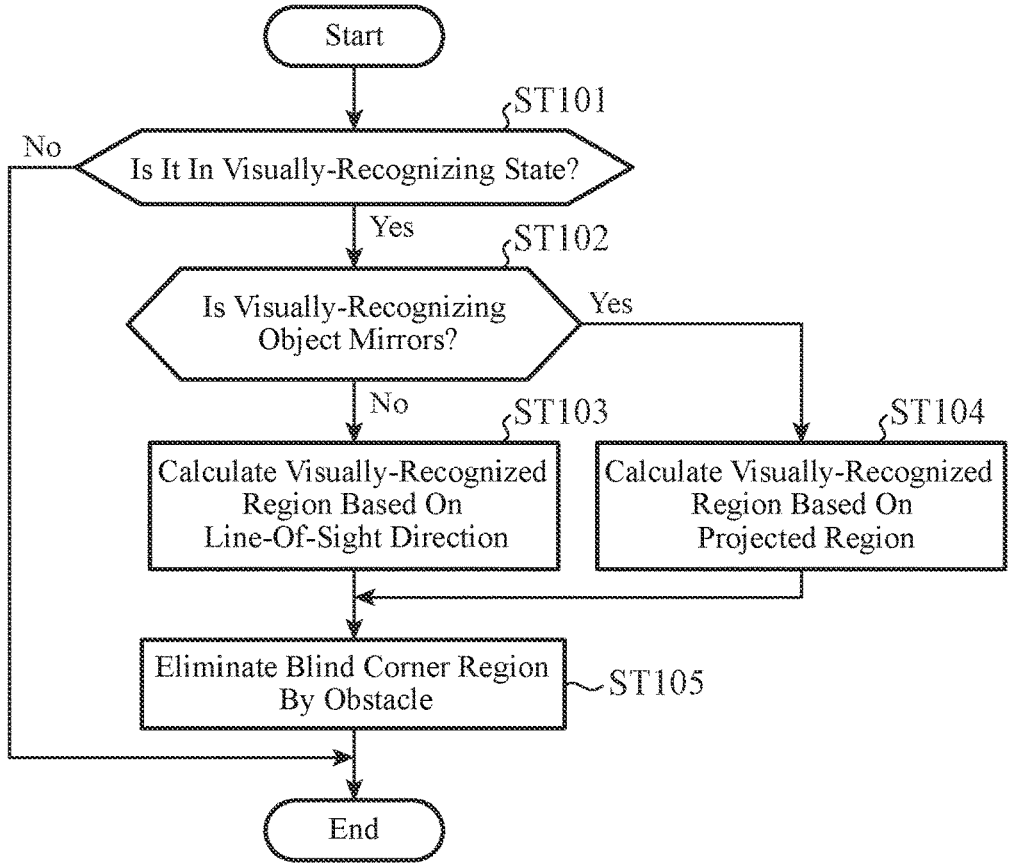
FIG. 5 is a flowchart illustrating operation of a visually-recognized-region calculating unit at step ST100 in FIG. 4 in detail.

Step ST100 is a process of calculating the visually-recognized region. At step ST100, the visually-recognized-region calculating unit 101 calculates the visually-recognized region. FIG. 5 is a flowchart illustrating operation of the visually-recognized-region calculating unit 101 at step ST100 in detail.

Figure 6:
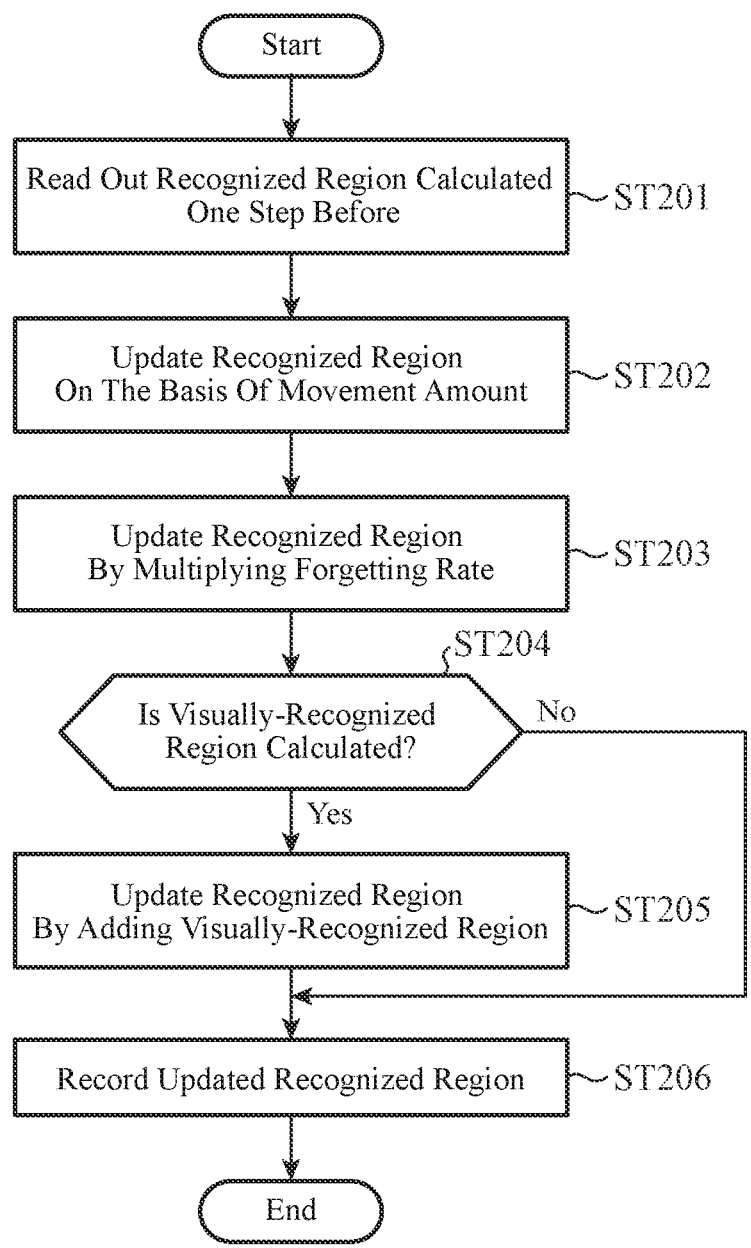
FIG. 6 is a flowchart illustrating operation of the recognized-region calculating unit at step ST200 in FIG. 4 in detail.

Step ST200 is a process of calculating the recognized region. At step ST200, the recognized-region calculating unit 104 calculates the recognized region. FIG. 6 is a flowchart illustrating operation of the recognized-region calculating unit 104 at step ST200 in detail.

Figure 7:
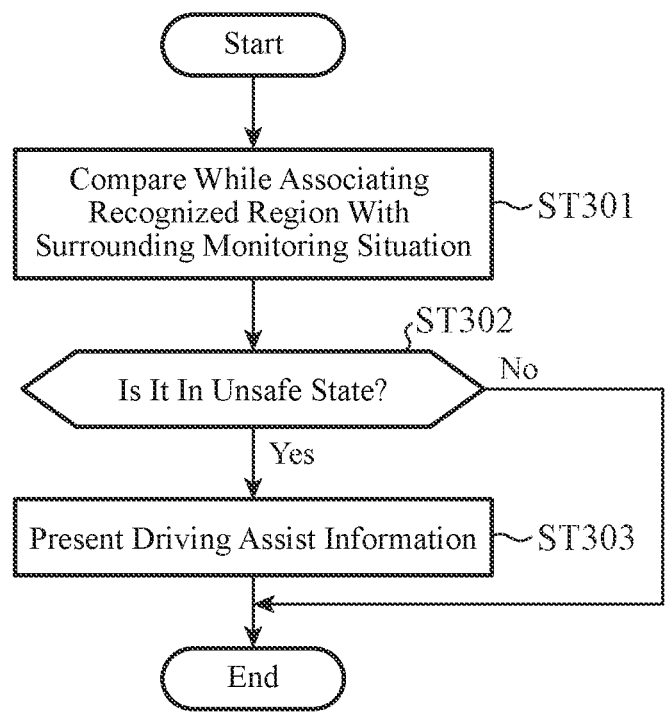
FIG. 7 is a flowchart illustrating operation of a driving state determining unit at step ST300 in FIG. 4 in detail.

Step ST300 is a process of determining the driving state. At step ST300, the driving state determining unit 106 determines the driving state. FIG. 7 is a flowchart illustrating operation of the driving state determining unit 106 at step ST300 in detail.

The recognized-region estimation device 100 may synchronously execute the processes at steps ST100, ST200, and ST300 as a series of processes, or asynchronously execute them in accordance with a measuring period of the sensors 3 or an executing period of each process.

Next, a visually-recognized-region calculating process at step ST100 illustrated in FIG. 4 is described in detail with reference to FIG. 5.

At step ST101, the visually-recognized-region calculating unit 101 detects saccadic movement from the information on the line-of-sight direction received from the line-of-sight direction measuring unit 111. When the saccadic movement is detected, the visually-recognized-region calculating unit 101 determines that the driver is not in the visually-recognizing state, and in other cases, this determines that the driver is in the visually-recognizing state. This is determination in view of known findings that the state in a visual field is not recognized during the saccadic movement. The saccadic movement is a phenomenon that the eyeball moves at a high speed; simply, a case where a difference between the line-of-sight direction when step ST100 is previously executed and the line-of-sight direction when step ST100 is currently executed is larger than a preset threshold may be determined as the saccade movement. In addition, when additional information contributing to the determination of the visually-recognizing state such as the opening/closing state of the eyelid is obtained by the line-of-sight direction measuring unit 111, the visually-recognized-region calculating unit 101 may determine the visually-recognizing state using the additional information.

When it is determined that the driver is in the visually-recognizing state (Yes at step ST101), the visually-recognized-region calculating unit 101 shifts to step ST102, and when it is determined that the driver is not in the visually-recognizing state ("No" at step ST101), the visually-recognized-region calculating unit 101 finishes the visually-recognized-region calculating process.

At step ST102, the visually-recognized-region calculating unit 101 converts the installation positions and shapes of the mirrors to the same coordinate system as that of the line-of-sight direction as a relative angle with respect to the head position by using the information on the installation positions and shapes of the mirrors managed by the mirror managing unit 102 and the information on the head position received from the head position measuring unit 112. When the line-of-sight direction received from the line-of-sight direction measuring unit 111 is included in the positions and shapes of the mirrors, the visually-recognized-region calculating unit 101 determines that a visually-recognized object of the driver is the mirrors (Yes at step ST102) and shifts to step ST104, and otherwise, this determines that the visually-recognized object is not the mirrors ("No" at step ST102) and shifts to step ST103.

At step ST103, the visually-recognized-region calculating unit 101 calculates the visually-recognized region in the mobile body coordinate system from the information on the line-of-sight direction received from the line-of-sight direction measuring unit 111 and the information on the head position received from the head position measuring unit 112. The visually-recognized-region calculating unit 101 sets the visually-recognized region as a fan-shaped region extending in an X-axis direction with the head position as an apex and the line-of-sight direction as a central axis. The visually-recognized-region calculating unit 101 may also set the visually-recognized region as a three-dimensional region extending in an elliptical conical shape with the head position as an apex and the line-of-sight direction as a central axis. Furthermore, the visually-recognized-region calculating unit 101 desirably sets a weight such that a degree of recognition increases in accordance with proximity to the central axis of the visually-recognized region, and the degree of recognition increases as in accordance with proximity to the apex that is the head position. This is configured in view of known findings concerning human visual field characteristics.

At step ST104, the visually-recognized-region calculating unit 101 obtains information on the projected region of the mirrors determined to include the line-of-sight direction at step ST102 from the mirror managing unit 102. Then, the visually-recognized-region calculating unit 101 calculates the visually-recognized region in the mobile body coordinate system on the basis of the projected region obtained from the mirror managing unit 102. It is desirable that the visually-recognized-region calculating unit 101 set the weight for the visually-recognized region based on the projected region based on the human visual field characteristics, display resolution of the electronic mirrors or the like similar to those at step ST103.

At step ST105, the visually-recognized-region calculating unit 101 obtains the information on the position and shape of the shielding object managed by the shielding object managing unit 103. Then, the visually-recognized-region calculating unit 101 excludes a region where the line of sight of the driver is blocked by the shielding object, the region becoming a blind corner out of the visually-recognized region calculated at step ST103 or ST104. In addition, it is desirable that the visually-recognized-region calculating unit 101 receive the information indicating the situation around the vehicle from the surrounding situation monitoring unit 121 and exclude the region that is the blind corner by the obstacle, hazardous object or the like from the visually-recognized region.

Next, a recognized-region calculating process at step ST200 illustrated in FIG. 4 is described in detail with reference to FIGS. 6 and 8A to 8D.

At step ST201, the recognized-region calculating unit 104 obtains the information on the recognized region calculated when step ST200 is previously executed from the recognized-region recording unit 105. Note that, since the information on the recognized region is not recorded in the recognized-region recording unit 105 at the time of first execution, the recognized-region calculating unit 104 initializes an entire recognized region to zero and regards the same as the information on the recognized region calculated when step ST200 is previously executed.

Figure 8A:
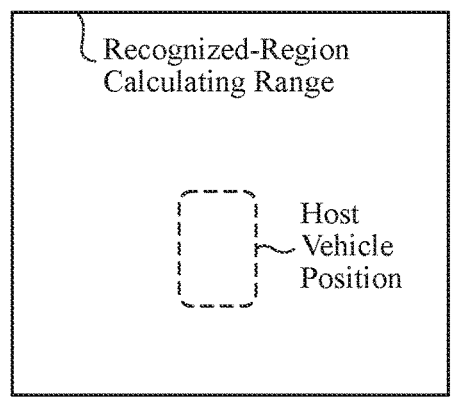
FIGS. 8A, 8B, 8C, and 8D are views for illustrating a recognized region calculated by the recognized-region calculating unit.
Figure 8B:
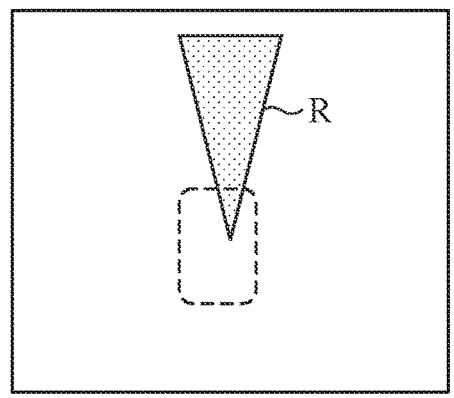

FIG. 8A is a view illustrating the recognized region in the initial state. Since the entire recognized region is initialized in the initial state, there is no recognized region. FIG. 8B is a view illustrating a recognized region R obtained by the recognized-region calculating unit 104 from the recognized-region recording unit 105 at step ST201. The recognized region R illustrated in FIG. 8B is based on the information on the past recognized region recorded in the recognized-region recording unit 105. Note that, in FIGS. 8A and 8B, a rectangular frame in a solid line is a recognized-region calculating range which is a calculation target made by the recognized-region calculating unit 104, and a broken line indicates a position of a host vehicle. The position of the host vehicle is illustrated for the sake of description and is not necessary in an actual recognized-region calculating process.

At step ST202, the recognized-region calculating unit 104 updates the recognized region using the information on the movement amount of the vehicle received from the movement amount measuring unit 113. The recognized-region calculating unit 104 updates the recognized region by rotating and translating the vehicle around the origin on the basis of an angle and a distance corresponding to the movement amount in a period from when step ST200 is previously executed to when step ST200 is currently executed. Herein, it is desirable that the origin corresponds to a measured site measured by the movement amount measuring unit 113. More simply, the center, center of gravity and the like of the vehicle may also be used as the origin.

Formula (1) is a specific example of a recognized-region calculating procedure at step ST202. As for the recognized region R defined in the mobile body coordinate system, the recognized region R at previous step n is updated to a recognized region $R_1$ at current step n+1 by formula (1).

Note that, because of the electronic filing, "~" attached above an alphabet character is expressed as "(tilde)".

$$R_1(x, y, n+1) := R(\tilde{x}, \tilde{y}, n) \quad (1)$$

$$\begin{bmatrix} \tilde{x} \\ \tilde{y} \end{bmatrix} = \begin{bmatrix} \cos\theta & -\sin\theta \\ \sin\theta & \cos\theta \end{bmatrix} \times \left( \begin{bmatrix} x \\ y \end{bmatrix} + \begin{bmatrix} dx \\ dy \end{bmatrix} \right)$$

R: recognized region
n: number of steps
x,y: coordinates at step n+1 in mobile body coordinate system
θ: rotational component of movement amount in period from step n to step n+1 (yaw axis)
dx,dy: translation component of movement amount in period from step n to step n+1 (X axis, Y axis)

Note that, since the region recorded as the recognized region R has a finite range, x (tilde) and y (tilde) are not always included in the recognized region R. In this case, as values of x (tilde) and y (tilde), it is desirable to use values at intersections of line segments from x (tilde) and y (tilde) as a stating point to the center of the vehicle or the driver as a final point, and an outer edge of the recognized region R. This is in view of the characteristics of the recognized region that the values of the recognized region are radially distributed around the vehicle or the driver globally. More simply, a value of a point closest to the X axis in the recognized region R may be used as x (tilde), and a value of a point closest to the Y axis in the recognized region R may be used as y (tilde). This brings excellent approximation when the rotation amount per unit time is close to zero such as when a forward movement component is larger than a lateral movement component or when the movement amount per unit time is sufficiently small especially in a case of vehicles. Furthermore, when the recognized region R is sufficiently wide relative to the visual field of the driver, zero may be used as the values of x (tilde) and y (tilde).

Also, since the recognized region R is discretely recorded in a time domain, x (tilde) and y (tilde) do not necessarily refer to lattice points defined in the recognized region R. In this case, it is desirable to use a weighted average value weighted by the distance from each apex of a lattice plane including x (tilde) and y (tilde). More simply, a value of a lattice point closest to x (tilde) and y (tilde) in the recognized region R may be used.

Figure 8C:
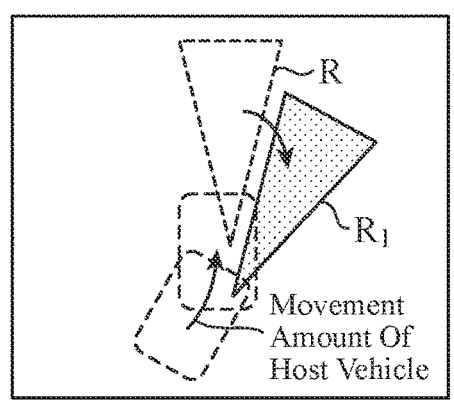

FIG. 8C is a view illustrating the recognized region $R_1$ updated at step ST202.

At step ST203, the recognized-region calculating unit 104 updates the recognized region by multiplying a forgetting rate based on time elapsed from when step ST200 is previously executed to when ST200 is currently executed by the recognized region updated at step ST202. The weight of the degree of recognition in the recognized region decreases on the basis of the forgetting rate.

Formula (2) is a specific example of the recognized-region calculating procedure at step ST203. By formula (2), the forgetting rate of the recognized region corresponding to a period from previous step n to current step n+1 is reflected in the recognized region $R_1$ defined in the mobile body coordinate system, and the recognized region $R_1$ is updated to a recognized region $R_2$.

$$R_2(x,y,n+1) := R_1(x,y,n+1) \times \gamma^t \quad (2)$$

R: recognized region
n: number of steps
x,y: coordinates at step n+1 in mobile body coordinate system
t: time elapsed in period from step n to step n+1
γ: forgetting rate per unit time At step ST204, the recognized-region calculating unit 104 determines whether the visually-recognized-region calculating unit 101 calculates the visually-recognized region at step ST100. When it is determined that the visually-recognized region is calculated by the visually-recognized region calculating unit 101 (Yes at step ST204), the recognized-region calculating unit 104 shifts to step ST205, and when it is determined that the visually-recognized region is not calculated ("No" at step ST204), this shifts to step ST206.

At step ST205, the recognized-region calculating unit 104 receives the information on the visually-recognized region from the visually-recognized-region calculating unit 101 and updates the recognized region by adding the received visually-recognized region to the recognized region updated at step ST203.

Formula (3) is a specific example of the recognized-region calculating procedure at step ST205. By formula (3), a value at step n+1 of a visually-recognized region S defined in the mobile body coordinate system is added to the recognized region $R_2$ defined in the mobile body coordinate system, and the recognized region $R_2$ is updated to the recognized region R.

$$R(x,y,n+1) := R_2(x,y,n+1) + S(x,y,n+1) \quad (3)$$

Figure 8D:
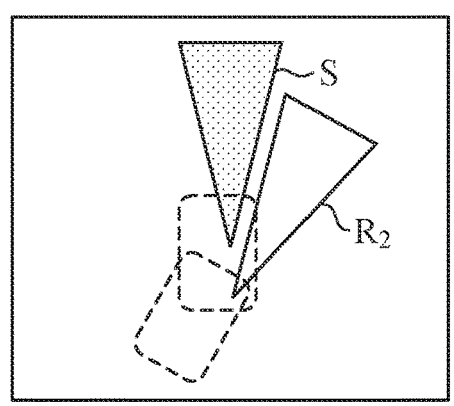

R: recognized region
S: visually-recognized region
n: number of steps
x,y: coordinates at step n+1 in mobile body coordinate system FIG. 8D is a view illustrating the recognized region R updated at step ST205. The recognized region R is a region including the recognized region $R_2$ and the visually-recognized region S.

At step ST206, the recognized-region calculating unit 104 outputs the recognized region updated at step ST203 or the recognized region updated at step ST205 to the recognized-region recording unit 105 to record.

Next, a driving state determining procedure at step ST300 illustrated in FIG. 4 is described in detail with reference to FIG. 7.

At step ST301, the driving state determining unit 106 obtains the information on the recognized region calculated by the recognized-region calculating unit 104 at step ST200 and recorded in the recognized-region recording unit 105 from the recognized-region recording unit 105. Also, the driving state determining unit 106 receives the information indicating the situation around the vehicle from the surrounding situation monitoring unit 121 and determines the driving state by comparing the situation around the vehicle with the recognized region obtained from the recognized-region recording unit 105.

Formula (4) is a specific example of the driving state determining procedure at step ST301. By multiplying a degree of recognition $P_R$ in the mobile body coordinate system by a degree of hazard $P_H$ in the mobile body coordinate system by formula (4), a recognitive degree of risk P in the mobile body coordinate system is calculated.

Herein, the degree of recognition $P_R$ is a value obtained by normalizing the recognized region R in formula (3) described above with a value between 0 and 1, the value probabilistically expressing the degree of recognition around the vehicle of the driver while associating a case where the driver does not recognize at all to 0 and associating a case where the driver completely recognizes to 1.

The degree of hazard $P_H$ is a value determined by the surrounding situation monitoring unit 121. As for a target to be watched out at the time of driving such as an obstacle including a pedestrian or another vehicle, the surrounding situation monitoring unit 121 mainly calculates contact probability and the like with the host vehicle on the basis of a distance, a relative speed and the like between the target and the host vehicle. The contact probability or the like is probabilistic formula of the degree of hazard $P_H$ of the target to be watched out during the driving. Alternatively, the surrounding situation monitoring unit 121 may calculate a value which probabilistically expresses a potential degree of hazard $P_H$ such as a blind corner or a region with poor visibility due to an obstacle.

The degree or risk P is a product of the degree of recognition and the degree of hazard. Therefore, when the degree of recognition is low and the degree of hazard is high, the degree or risk P becomes a larger value. Therefore, this is an indicator indicating that the larger the degree of risk P, the higher the possibility that a hazardous factor at the point develops to an accident or the like. The driving state determining unit 106 uses this degree of risk P as the driving state.

$$P(x,y,n):=(1-P_R(x,y,n))\times P_H(x,y,n) \qquad (4)$$

P: recognitive degree of risk around vehicle
$P_R$: degree of recognition around vehicle in recognized region
$P_H$: degree of hazard around vehicle by surrounding situation
n: number of steps
x,y: coordinates at step n+1 in mobile body coordinate system At step ST302, the driving state determining unit 106 determines whether the driving state is in an unsafe state on the basis of the driving state calculated at step ST301. When the degree of risk P indicating the driving state is larger than a threshold determined in advance, the driving state determining unit 106 determines that it is in the unsafe state ("Yes" at step ST302) and shifts to step ST303, and otherwise ("No" at step ST302), the driving state determining unit 106 finishes the driving state determining process.

At step ST303, the driving state determining unit 106 outputs information indicating that the vehicle is in the unsafe state to the driving assist information presenting unit 107. The driving assist information presenting unit 107 generates information for calling attention of the driver of the vehicle in the unsafe state and outputs the same from the display 4 or the speaker 5. In addition, the driving assist information presenting unit 107 generates the driving assist information indicating a method of resolving the unsafe state and the like outputs the same from the display 4 or the speaker 5. For example, when detecting a mobile body approaching from a region where the degree of recognition of the driver is low as the unsafe state, the driving assist information presenting unit 107 notifies the driver of the approach of the mobile body and urges the driver to visually recognize the mobile body. In addition, the driving assist information presenting unit 107 gives a warning to the approaching mobile body that the attention of the driver is diverted and urges the same to avoid. Furthermore, when the unsafe state is not resolved, the driving assist information presenting unit 107 urges the driver to take an avoidance action such as deceleration in accordance with the situation around the vehicle.

Also, when the recognized-region estimation device 100 mounted on the host vehicle and the recognized-region estimation device 100 mounted on another vehicle are capable of communicating wirelessly by mobile communication, inter-vehicle communication or the like, it is also possible to configure to transmit the information from the recognized-region estimation device 100 of the host vehicle to the recognized-region estimation device 100 of the other vehicle. For example, when the recognized-region estimation device 100 of the host vehicle determines that the host vehicle is in the unsafe state, it is also possible to configure to transmit the information for calling attention to the recognized-region estimation device 100 of another vehicle which causes the unsafe state, that is, the other vehicle which the driver of the host vehicle is not likely to recognize. The recognized-region estimation device 100 of the other vehicle presents the received information to a driver. In a case of this configuration, the driver of the other vehicle may avoid the host vehicle, and as a result, a possibility of developing to an accident or the like may be reduced.

When an external device which controls braking, steering or the like is mounted on the vehicle, it is also possible to configure such that the information on the driving state is output from the driving state determining unit 106 to the external device, and acceleration/deceleration, steering and the like of the vehicle is controlled by the external device, and the unsafe state is avoided.

As described above, the recognized-region estimation device 100 according to the first embodiment is provided with the visually-recognized-region calculating unit 101 which calculates the visually-recognized region visually recognized by the driver in the mobile body coordinate system based on the mobile body such as the vehicle on the basis of the line-of-sight direction of the driver, and the recognized-region calculating unit 104 which calculates the recognized region recognized by the driver in the mobile body coordinate system on the basis of the visually-recognized region calculated by the visually-recognized-region calculating unit 101. The visually-recognized region and the recognized region in the mobile body coordinate system are calculated, so that it is easy to cooperate with other sensors 3 for monitoring surroundings, for example, the surrounding situation monitoring unit 121 managed in the mobile body coordinate system. As a result, for example, the driving state determining unit 106 may efficiently estimate a surrounding recognizing status of the driver.

In addition, since the recognized-region estimation device 100 according to the first embodiment is configured to manage only the recognized region in the mobile body coordinate system, operation via the map coordinate system as with a visual field estimating device according to Patent Literature 1 becomes not necessary at all. Therefore, by using only the inertia information measured by the sensors 3 such as the gyroscope more robust than the GPS, it becomes possible to specify the position of the host vehicle and estimate the recognized region.

The recognized-region estimation device 100 according to the first embodiment is also provided with the mirror managing unit 102 which records the installation positions and the projected region projected in the mirrors in the mobile body coordinate system of the mirrors installed in the mobile body. When the line-of-sight direction of the driver is included in the installation positions of the mirrors managed by the mirror managing unit 102, the visually-recognized-region calculating unit 101 makes the projected region of the mirrors the visually-recognized region of the driver. Therefore, the visually-recognized region and the recognized region may be estimated more accurately.

In addition, the recognized-region estimation device 100 according to first embodiment is provided with the surrounding situation monitoring unit 121 which monitors the surroundings of the mobile body and detects the obstacle in the mobile body coordinate system. Then, the visually-recognized-region calculating unit 101 is configured to calculate the blind corner region that is the blind corner by the obstacle detected by the surrounding situation monitoring unit 121, and eliminate the blind corner region from the visually-recognized region of the driver. Therefore, the visually-recognized region and the recognized region may be estimated more accurately.

In addition, the recognized-region estimation device 100 according to first embodiment is provided with the movement amount measuring unit 113 which measures the movement amount per unit time of the mobile body in the mobile body coordinate system. Then, the recognized-region calculating unit 104 is configured to move the recognized region calculated prior to one unit time on the basis of the movement amount per unit time measured by the movement amount measuring unit 113, and update the recognized region by adding the visually-recognized region calculated by the visually-recognized-region calculating unit 101 to the moved recognized region.

In the visual field estimating device according to Patent Literature 1 described above, in order to efficiently estimate the surrounding recognizing status of the driver, the visual field range is updated per unit time by difference calculation. However, since the vehicle moves every moment, the region where the surrounding recognizing status of the driver should be estimated also changes every moment in the map coordinate system, and the vehicle moves a significantly large region as compared to the region in which the surrounding recognizing status of the driver should be estimated. Therefore, in order for the visual field estimating device to execute update of the visual field range described above, means of specifying the region in which the surrounding recognizing status should be estimated at each updating step and means of managing the region and reflecting the region in an updating process are necessary; however, such means are neither disclosed nor suggested. When such means is not provided, practically an infinite storage area is necessary except under spatially limited conditions such as a parking lot, so that it is actually difficult to execute the update of the visual field range.

On the other hand, the recognized-region estimation device 100 according to the first embodiment may calculate the recognized region in the mobile body coordinate system by the difference calculation per unit time in a finite storage area, so that an effect of enabling efficient estimation of the recognized region in the mobile body coordinate system is obtained.

The recognized-region estimation device 100 according to the first embodiment is provided with the surrounding situation monitoring unit 121 which monitors the surroundings of the mobile body and determines the degree of hazard of the mobile body in the mobile body coordinate system, and the driving state determining unit 106 which determines the driving state of the mobile body using the degree of hazard determined by the surrounding situation monitoring unit 121 and the recognized region calculated by the recognized-region calculating unit 104. Since the degree of hazard and the recognized region are managed in the same mobile body coordinate system, it is possible to efficiently determine the driving state.

Second Embodiment

In a second embodiment, a configuration of improving accuracy of the recognized-region calculating process in the first embodiment is described.

Hereinafter, a difference between the first embodiment and the second embodiment is mainly described. Those not especially mentioned conform to those of the first embodiment, and FIGS. 1 to 8 are used thereto.

When calculating a visually-recognized region, there is a demand to assign a weight to a degree of recognition on the basis of an environmental condition around a vehicle. For example, even when a driver is gazing forward, a visually-recognized region in the daytime is different from a visually-recognized-region at night.

Therefore, a recognized-region estimation device 100 according to the second embodiment is configured to change the visually-recognized region on the basis of a surrounding environmental condition.

A surrounding situation monitoring unit 121 of the second embodiment also measures information affecting a visually-recognizing state of the driver such as brightness or weather in addition to an obstacle, a hazardous object or the like around the vehicle as information indicating a situation around the vehicle. The surrounding situation monitoring unit 121 may measure whether a view of the driver is dazzled, for example, by headlights of an oncoming vehicle at night, sunlight in the day time or the like as the information affecting the visually-recognizing state of the driver. Then, the surrounding situation monitoring unit 121 outputs the information on the obstacle, the hazardous object or the like around the vehicle and the information affecting the visually-recognizing state such as brightness or weather to a visually-recognized-region calculating unit 101 as the information indicating the situation around the vehicle.

In the second embodiment, at step ST101 in FIG. 5, the visually-recognized-region calculating unit 101 may not only determine the visually-recognizing state of the driver on the basis of information on a line-of-sight direction received from a line-of-sight direction measuring unit 111 but also determine the visually-recognizing state of the driver on the basis of the information affecting the visually-recognizing state of the driver received from the surrounding situation monitoring unit 121. When receiving the information indicating that the view of the driver is dazzled, for example, by the headlights of the oncoming vehicle at night, sunlight in the day time or the like from the surrounding situation monitoring unit 121, the visually-recognized-region calculating unit 101 desirably determines no visually-recognizing state even when saccadic movement is not detected ("No" at step ST101). This is configured in view of known findings concerning human visual field characteristics.

In the second embodiment, at step ST103 in FIG. 5, the visually-recognized-region calculating unit 101 receives the information affecting the visually-recognizing state of the driver from the surrounding situation monitoring unit 121, and shortens a distance and a width of the visually-recognized region in an environment with poor visibility. Furthermore, it is desirable that the visually-recognized-region calculating unit 101 set a weight such that a degree of recognition of an entire visually-recognized region becomes lower in the environment with poor visibility. This is configured in view of known findings concerning human visual field characteristics.

As described above, the recognized-region-estimation device 100 according to the second embodiment is provided with the surrounding situation monitoring unit 121 which monitors surroundings of the mobile body such as the vehicle and measures the information affecting the visually-recognizing state of the driver. Then, the visually-recognized-region calculating unit 101 is configured to adjust the weight of the degree of recognition within the visually-recognized region on the basis of a measured result of the surrounding situation monitoring unit 121. As a result, an effect of enabling calculation of the visually-recognized region more appropriately reflecting the human visual field characteristics is obtained.

Third Embodiment

Since a visually-recognized region originally has three-dimensional distribution, it is desirable to calculate the visually-recognized region in a three-dimensional space as in the first and second embodiments. On the other hand, it is more efficient to calculate a two-dimensional visually-recognized region as for a storage area and a calculation amount. Therefore, in a third embodiment, a configuration of calculating the two-dimensional visually-recognized region equivalent to a three-dimensional visually-recognized region while reducing load on the storage area and the calculation amount is described.

A difference between the first embodiment and the third embodiment is mainly described below. Those not especially mentioned conform to those of the first embodiment, and FIGS. 1 to 8 are used thereto. Although an example obtained by combining the third embodiment with the first embodiment is described below, the third embodiment may also be combined with the second embodiment.

In the third embodiment, at step ST103 in FIG. 5, when calculating a visually-recognized region from information on a line-of-sight direction received from a line-of-sight direction measuring unit 111, a visually-recognized-region calculating unit 101 supposes that a height of a head position and the like of a driver is a height of an eye level of the driver and simulates the two-dimensional visually-recognized region by projecting a line-of-sight region calculated in the three-dimensional space on a two-dimensional XY plane at that height. Note that the height of the eye level of the driver is not limited to the height of the head position of the driver but may be about a height of a steering wheel, a height of the vehicle or the like.

In the third embodiment, at step ST103 in FIG. 5, the visually-recognized-region calculating unit 101 detects whether a line of sight intersects with a road surface from a pitch in the information on the line-of-sight direction received from the line-of-sight direction measuring unit 111. When detecting that the line of sight intersects with the road surface, the visually-recognized-region calculating unit 101 desirably limits the two-dimensional visually-recognized region to a triangular region having a distance from the driver to the road surface as a limit distance of the visually-recognized region.

Furthermore, the visually-recognized-region calculating unit 101 detects from the pitch in the information on the line-of-sight direction received from the line-of-sight direction measuring unit 111 whether the line-of-sight direction faces upward at a predetermined or larger angle with respect to a horizontal plane. The predetermined angle is a value for determining whether the visually-recognized region is at the height of the eye level of the driver or the like, and is determined in advance in the visually-recognized-region calculating unit 101. When detecting that the line-of-sight direction faces upward at the predetermined or larger angle with respect to the horizontal plane, it is desirable that the visually-recognized-region calculating unit 101 treat that there is no visually-recognized region.

As described above, the visually-recognized-region calculating unit 101 in the recognized-region estimation device 100 according to the third embodiment has a configuration of simulating the visually-recognized region when the visually-recognized region in the three-dimensional space is projected on the two-dimensional plane. As a result, it is possible to simulate the visually-recognized region when the visually-recognized region originally distributed in the three-dimensional space is projected on the two-dimensional plane at the height of the eye level of the driver. Therefore, an effect of enabling simulative calculation of the visually-recognized region similar to that of a three-dimensional embodiment is also obtained on the two-dimensional plane in a two-dimensional embodiment.

Fourth Embodiment

In a fourth embodiment, a configuration of improving accuracy of the recognized-region calculating process in the first embodiment is described.

Hereinafter, a difference between the first embodiment and the fourth embodiment is mainly described. Those not especially mentioned conform to those of the first embodiment, and FIGS. 1 to 8 are used thereto. Although an example obtained by combining the fourth embodiment with the first embodiment is described below, the fourth embodiment may also be combined with the second or third embodiment.

Formula (4) in the first embodiment treats the recognized region R as a mode interpretable as probability by normalizing the same by a value between 0 and 1 and associating a case where a driver does not recognize at all with 0 and associating a case where the driver completely recognizes with 1. In such a case, there is a possibility that probabilistic characteristics cannot be held by updating by simple addition as expressed by formula (3). For example, when the driver gazes a certain region for a sufficient time, a value of a degree of recognition in a recognized region $R_2$ in this region should converge to 1, but since a line of sight stays in this region at the same time, a degree of recognition in a visually-recognized region S also becomes a value close to 1. Therefore, when they are simply added to be updated, the value of the degree of recognition exceeds 1 and a requirement as the probability is not satisfied.

Therefore, in the fourth embodiment, a recognized-region estimation device 100 has the following configuration.

In the fourth embodiment, at step ST205 in FIG. 6, a recognized-region calculating unit 104 updates a recognized region R by probabilistic addition.

Formula (5) is a specific example of a recognized-region calculating procedure at step ST205 in the fourth embodiment. In formula (5), $P_S$ represents a visually-recognized region S calculated by a visually-recognized-region calculating unit 101 by associating a case where a driver does not recognize at all with 0 and associating a case where the driver completely recognizes with 1. With such a configuration, the recognized region R calculated by the recognized-region calculating unit 104 becomes a value which may be directly used as a degree of recognition $P_R$ in formula (4) above because the characteristic as the probability are always held.

$$R(x,y,n+1):=R_2(x,y,n+1)+(1-R_2(x,y,n+1))\times P_S(x,y,n+1) \quad (5)$$

R: degree of recognition around vehicle in recognized region
$P_S$: degree of recognition around vehicle in visually-recognized region
n: number of steps
x,y: coordinates at step n+1 in mobile body coordinate system As described above, in the recognized-region estimation device 100 according to the fourth embodiment, the recognized-region calculating unit 104 is configured to add the probability indicating a degree of recognition within the recognized region and the probability indicating a degree of recognition within the visually-recognized region. Treating the values of the recognized region and the visually-recognized region as a mode which may be interpreted as the probability brings an effect of enabling efficient calculation of the recognized region.

Fifth Embodiment

In a fifth embodiment, a configuration of improving accuracy of the recognized-region calculating process in the first embodiment is described.

A difference between the first embodiment and the fifth embodiment is mainly described below. Those not especially mentioned conform to those of the first embodiment, and FIGS. 1 to 8 are used thereto. Although an example obtained by combining the fifth embodiment with the first embodiment is described below, the fifth embodiment may also be combined with the second, third, or fourth embodiment.

When time resolution is not sufficient in any one of a line-of-sight direction measuring unit 111, a head position measuring unit 112, and a movement amount measuring unit 113, a change region per unit time, that is, a difference between a previously calculated recognized region and a currently calculated recognized region increases in a recognized-region calculating process of a recognized-region calculating unit 104. Then, there is a case where the recognized region becomes discontinuous in a time domain. Also, when measuring periods of the line-of-sight direction measuring unit 111, the head position measuring unit 112, and the movement amount measuring unit 113 are different from one another, for example, an error due to time lag might occur when the visually-recognized region and the recognized region are overlapped, or a calculating period of the recognized region might be restricted by a measuring unit having a longest measuring period.

Also, there is a demand to predict the recognized region after a short time by simulating movement of a vehicle in advance. For example, at the time of right/left turn at an intersection, it is expected to estimate a hazardous object and the like at each stage in advance and warn a driver about the same by calculating an assumed recognized region during and after the right/left turn.

Therefore, in the fifth embodiment, a recognized-region estimation device 100 has the following configuration.

Figure 9:
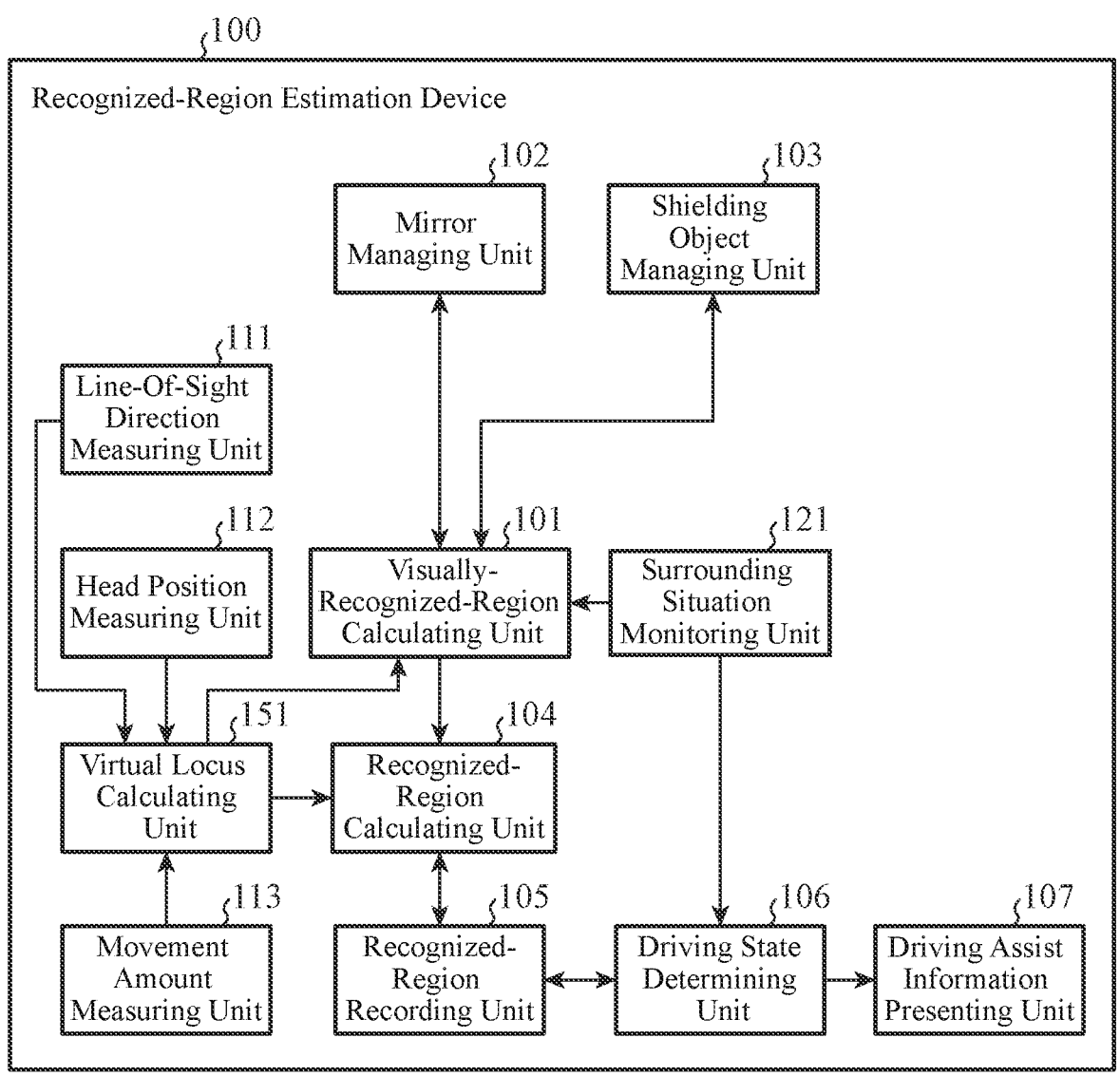
FIG. 9 is a functional block diagram illustrating a configuration example of a recognized-region estimation device according to a fifth embodiment of the present invention.

FIG. 9 is a functional block diagram illustrating a configuration example of the recognized-region estimation device 100 according to the fifth embodiment. The recognized-region estimation device 100 according to the fifth embodiment is provided with a virtual locus calculating unit 151 which calculates a virtual locus of a line-of-sight direction and the like used for calculating the visually-recognized region.

Figure 10:
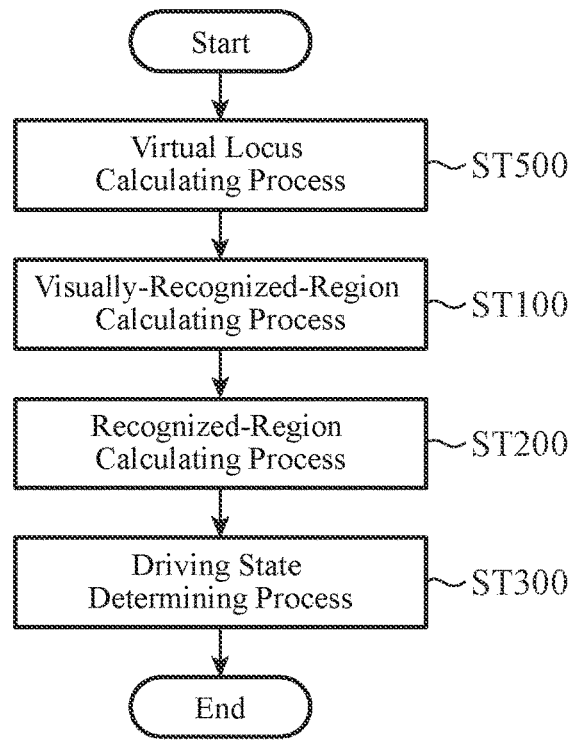
FIG. 10 is a flowchart illustrating operation of the recognized-region estimation device according to the fifth embodiment.

FIG. 10 is a flowchart illustrating operation of the recognized-region estimation device 100 according to the fifth embodiment.

Figure 11:
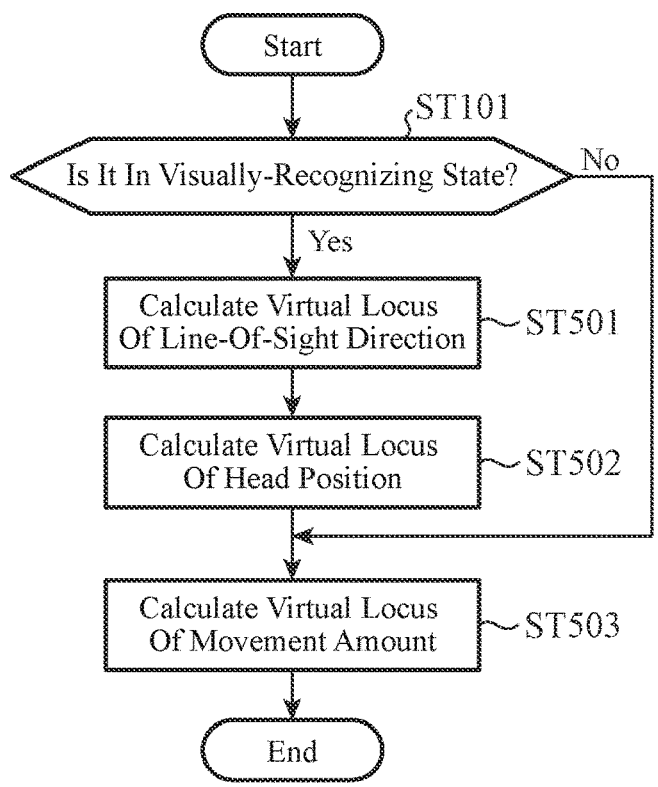
FIG. 11 is a flowchart illustrating operation of a virtual locus calculating unit at step ST500 in FIG. 10 in detail.

Step ST500 is a process of calculating the virtual locus. At step ST500, the virtual locus calculating unit 151 calculates the virtual locus. FIG. 11 is a flowchart illustrating operation of the virtual locus calculating unit 151 at step ST500 in detail.

Processes at steps ST100, ST200, and ST300 are similar to the processes illustrated in FIGS. 4 to 7 of the first embodiment. However, the recognized-region estimation device 100 according to the fifth embodiment is different in executing the processes at steps ST100, ST200, and ST300 on the virtual locus at certain time after current time calculated at step ST500. The certain time after the current time includes certain time between current step ST500 and previous step ST500.

Next, a virtual locus calculating process at step ST500 illustrated in FIG. 10 is described in detail with reference to FIG. 11.

At step ST101, a visually-recognized-region calculating unit 101 performs the same process as that at step ST101 in FIG. 5, determines whether the driver of the vehicle is in a visually-recognizing state, and outputs a determined result to the virtual locus calculating unit 151. When it is determined that the driver is in the visually-recognizing state (Yes at step ST101) by the visually-recognized-region calculating unit 101, the virtual locus calculating unit 151 shifts to step ST501, and when it is determined that the driver is not in the visually-recognizing state ("No" at step ST101), this shifts to step ST503.

At step ST501, the virtual locus calculating unit 151 calculates an estimated value of the line-of-sight direction at certain time after the current time from information on the line-of-sight direction received from the line-of-sight direction measuring unit 111 and the like. The virtual locus calculating unit 151 estimates the line-of-sight direction at certain time by, for example, linear interpolation or the like using the line-of-sight direction when step ST500 is previously executed and the line-of-sight direction when step ST500 is currently executed. Alternatively, the virtual locus calculating unit 151 may also estimate the line-of-sight direction by assuming that the line-of-sight direction does not change from the current time to certain time or the like in the prediction after a short time. As a result, the virtual locus calculating unit 151 calculates the virtual locus of the line-of-sight direction.

At step ST502, the virtual locus calculating unit 151 calculates an estimated value of a head position at certain time after the current time from information on a head position and the like received from the head position measuring unit 112. The virtual locus calculating unit 151 estimates the head position at certain time by, for example, linear interpolation or the like using the head position when step ST500 is previously executed and the head position when step ST500 is currently executed. Alternatively, the virtual locus calculating unit 151 may also estimate the head position assuming that the head position does not change from the current time to certain time or the like in the prediction after a short time. As a result, the virtual locus calculating unit 151 calculates the virtual locus of the head position.

At step ST503, the virtual locus calculating unit 151 calculates an estimated value of a movement amount at certain time after the current time from information on the movement amount received from the movement amount measuring unit 113 and the like. The virtual locus calculating unit 151 estimates the movement amount at certain time by, for example, linear interpolation or the like using the movement amount when step ST500 is previously executed and the movement amount when step ST500 is currently executed. Alternatively, the virtual locus calculating unit 151 may also estimate the movement amount assuming that the movement amount does not change from the current time to certain time or the like in the prediction after a short time. In a more sophisticated manner, the virtual locus calculating unit 151 desirably calculates an interpolated value by using a smooth curve such as a spline function when calculating the locus of the vehicle in a mobile body coordinate system by using the movement amount when step ST500 is previously and currently executed in consideration of continuity of the locus of the mobile body. Also, in the prediction after a short time, the virtual locus calculating unit 151 may estimate a route through which a host vehicle is expected to pass after a short time by using information on a road shape in a vehicle travel direction or a guide route of a navigation system and make the route the locus of the vehicle. As a result, the virtual locus calculating unit 151 calculates the virtual locus of the movement amount.

As described above, the recognized-region estimation device 100 according to the fifth embodiment is provided with the virtual locus calculating unit 151 which estimates the line-of-sight direction at time after the current time. The visually-recognized-region calculating unit 101 is configured to calculate the visually-recognized region at time after the current time on the basis of the line-of-sight direction estimated by the virtual locus calculating unit 151. As a result, it is possible to interpolate the measuring period of the line-of-sight direction measuring unit 111 and obtain an effect of enabling calculation of the estimated result of a smooth recognized region. Furthermore, an effect of enabling estimation of the recognized region after a short time is obtained.

It is also possible to configure such that the virtual locus calculating unit 151 estimates the movement amount of the mobile body at time after the current time, and the recognized-region calculating unit 104 calculates the recognized region at time after the current time on the basis of the movement amount calculated by the virtual locus calculating unit 151.

It is also possible to configure such that the virtual locus calculating unit 151 estimates the line-of-sight direction and the movement amount at time after the current time, the visually-recognized-region calculating unit 101 calculates the visually-recognized region at time after the current time on the basis of the line-of-sight direction estimated by the virtual locus calculating unit 151, and the recognized-region calculating unit 104 calculates the recognized region at time after the current time on the basis of the movement amount calculated by the virtual locus calculating unit 151.

Furthermore, the virtual locus calculating unit 151 may also be configured to estimate the virtual locus of not only the line-of-sight direction or the movement amount but also the head position.

As described above, the recognized-region estimation device 100 is provided with the virtual locus calculating unit 151, so that there is an effect of enabling estimation of the recognized region independent from the measuring period even when the measuring periods of the line-of-sight direction measuring unit 111, the head position measuring unit 112, and the movement amount measuring unit 113 are different from one another.

Sixth Embodiment

In a sixth embodiment, a configuration of improving accuracy of the driving state determining process in the first embodiment is described.

A difference between the first embodiment and the sixth embodiment is mainly described below. Those not especially mentioned conform to those of the first embodiment, and FIGS. 1 to 8 are used thereto. Although an example obtained by combining the sixth embodiment with the first embodiment is described below, the sixth embodiment may also be combined with the second, third, fourth, or fifth embodiment.

Figure 12:
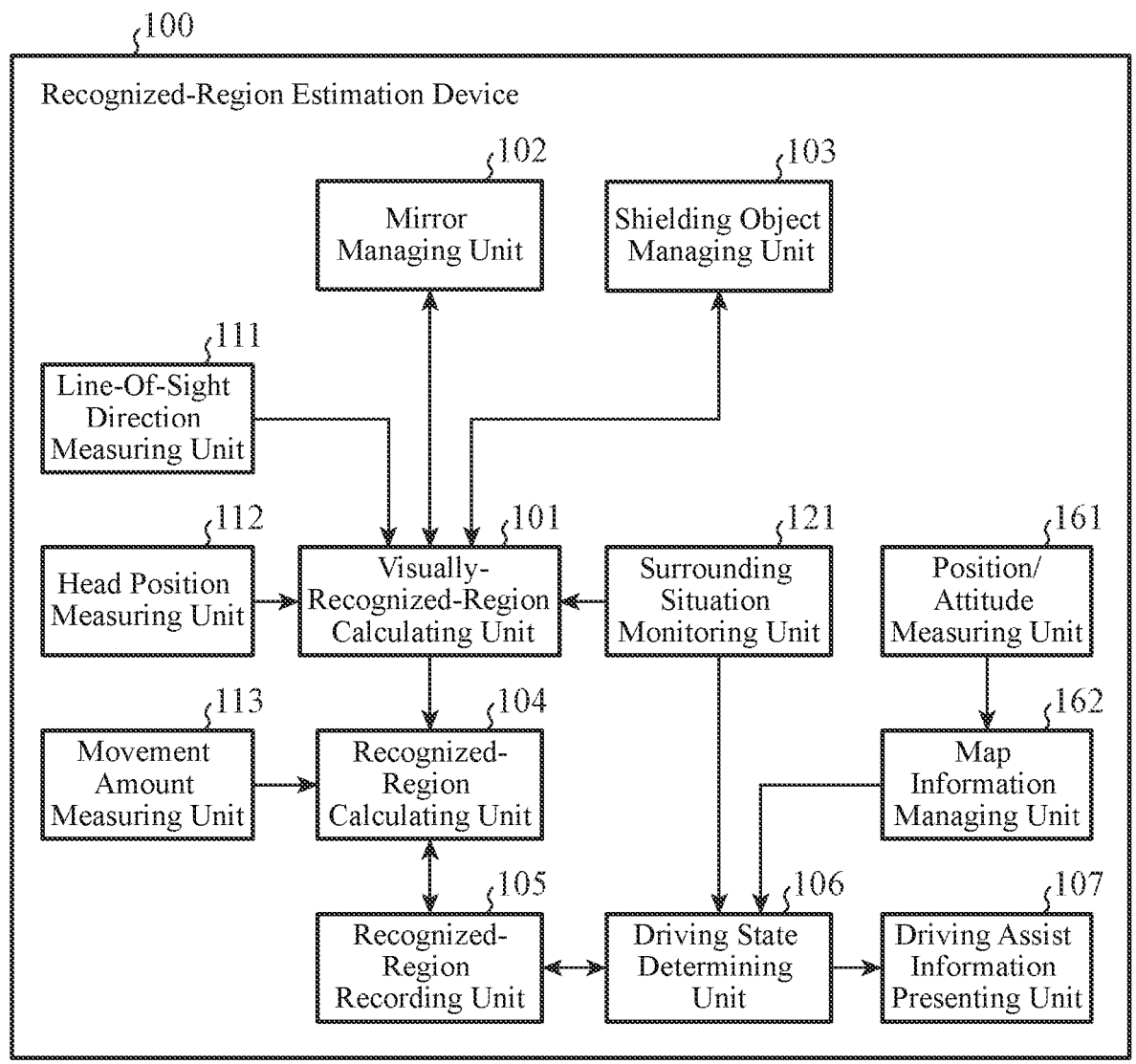
FIG. 12 is a functional block diagram illustrating a configuration example of a recognized-region estimation device according to a sixth embodiment of the present invention.

FIG. 12 is a functional block diagram illustrating a configuration example of a recognized-region estimation device 100 according to the sixth embodiment of the present invention.

A position/attitude measuring unit 161 obtains sensor detected values from sensors 3 such as a GPS or an azimuth indicator. The position/attitude measuring unit 161 measures a position and an attitude of a vehicle in a map coordinate system from the sensor detected values. The map coordinate system is a coordinate system fixed on a map space and is, for example, latitude and longitude. The position/attitude measuring unit 161 outputs information on the position and attitude of the vehicle to a map information managing unit 162.

The map information managing unit 162 manages map information used for travel of a mobile body such as a road or a signal. The map information managing unit 162 converts the position of the vehicle from the map coordinate system to a mobile body coordinate system by using the information on the position and attitude of the vehicle in the map coordinate system received from the position/attitude measuring unit 161. Also, the map information managing unit 162 extracts the map information around the vehicle, determines a potential degree of hazard such as a blind corner or a region where it is hard to see ahead due to an obstacle and the like, and outputs the same to a driving state determining unit 106. Especially, in the vehicle and the like, functions of the position/attitude measuring unit 161 and the map information managing unit 162 are provided together by known means such as a car navigation system. Therefore, the recognized-region estimation device 100 may be configured to use the car navigation system or the like as an external device without the position/attitude measuring unit 161 and the map information managing unit 162 provided.

Even when the recognized-region estimation device 100 is not provided with a surrounding situation monitoring unit 121, when there is the car navigation system mounted on the vehicle, or the position/attitude measuring unit 161 and the map information managing unit 162 having the function similar to that of the car navigation system, it is expected that driving assist based on a road condition is performed by utilizing the map information in the driving state determining unit 106. Also, even when the recognized-region estimation device 100 is provided with the surrounding situation monitoring unit 121, it is expected that the driving assist with higher accuracy is performed by using the map information together. For example, at the time of right/left turn at an intersection, it is required to carry out routine confirmation work such as confirmation whether a following vehicle is not caught, or whether there is a pedestrian on a crossing after the right/left turn or on a sidewalk connected to the crossing. However, since there are many obstacles such as street trees in these regions, and it is assumed an event that is difficult to be detected such that there is a pedestrian walking behind another pedestrian while passing over him/her, it is not always possible to appropriately determine a degree of hazard by the surrounding situation monitoring unit 121. In such a case, it is effective to determine the degree of hazard based on the road condition.

Therefore, in the sixth embodiment, the recognized-region estimation device 100 has the following configuration.

In the sixth embodiment, at step ST301 in FIG. 7, the map information managing unit 162 obtains information on the position and attitude of the vehicle in the map coordinate system from the position/attitude measuring unit 161. Next, the map information managing unit 162 extracts the map information around the vehicle on the basis of the position of the vehicle and calculates a degree of hazard H in the mobile body coordinate system from the extracted map information and the vehicle attitude. The degree of hazard H is simply calculated by converting the degree of hazard in the map coordinate system recorded in advance in the map information managing unit 162 into the mobile body coordinate system. On the basis of a surrounding road shape extracted from the map information managing unit 162, the degree of hazard H corresponding to the road shape is calculated in accordance with a rule determined in advance. Furthermore, it is desirable that the map information managing unit 162 perform weighting based on a relative speed between a hazardous site and the vehicle or a driving behavior such as the right/left turn on the calculated degree of hazard H. The map information managing unit 162 outputs the calculated degree of hazard H to the driving state determining unit 106.

The driving state determining unit 106 calculates formula (4) using the degree of hazard H in place of a degree of hazard $P_H$, or using the degree of hazard $P_H$ updated with the degree of hazard H. As a method of updating the degree of hazard $P_H$ with the degree of hazard H, for example, the driving state determining unit 106 calculates a weighted average value of the degree of hazard $P_H$ and the degree of hazard H, or a maximum value of the degree of hazard $P_H$ and the degree of hazard H.

As described above, the recognized-region estimation device 100 according to the sixth embodiment is provided with the map information managing unit 162 which determines the degree of hazard of the mobile body in the mobile body coordinate system by using the map information, and the driving state determining unit 106 which determines the driving state of the mobile body using the degree of hazard determined by the map information managing unit 162 and a recognized region calculated by the recognized-region calculating unit 104. As a result, an effect of enabling the driving assist based on the road condition by utilizing the map information is obtained.

Note that, in the present invention, embodiments may be freely combined, an arbitrary component of each embodiment may be deformed, or an arbitrary component of each embodiment may be omitted without departing from the scope of the invention.

INDUSTRIAL APPLICABILITY

The recognized-region estimation device according to the present invention estimates the surrounding recognizing status on the basis of the line-of-sight direction of the driver, so that this is suitable for use in the vehicle or the like having the driving assist function or the automated driving function.

REFERENCE SIGNS LIST

1: Processor, 2: Memory, 3: Sensors, 4: Display, 5: Speaker, 100: Recognized-region estimation device, 101: Visually-recognized-region calculating unit, 102: Mirror managing unit, 103: Shielding object managing unit, 104: Recognized-region calculating unit, 105: Recognized-region recording unit, 106: Driving state determining unit, 107: Driving assist information presenting unit, 111: Line-of-sight direction measuring unit, 112: Head position measuring unit, 113: Movement amount measuring unit, 121: Surrounding situation monitoring unit, 151: Virtual locus calculating unit, 161: Position/attitude measuring unit, 162: Map information managing unit.

The invention claimed is:

1. A recognized-region estimation device comprising:
    a visually-recognized-region calculator to calculate a visually-recognized region visually recognized by a driver of a mobile body in a mobile body coordinate system based on the mobile body on the basis of a received line-of-sight direction of the driver;
    a recognized-region calculator to calculate a recognized region recognized by the driver in the mobile body coordinate system on the basis of the visually-recognized region calculated by the visually-recognized-region calculator; and
    a movement amount measurer to measure a movement amount per unit time of the mobile body in the mobile body coordinate system,
    wherein the recognized-region calculator moves the recognized region calculated prior to one unit time on a basis of the movement amount per unit time measured by the movement amount measurer, and updates the recognized region by adding the visually-recognized region calculated by the visually-recognized-region calculator to the moved recognized region.

2. The recognized-region estimation device according to claim 1, comprising:
    a mirror manager to record an installation position in the mobile body coordinate system of mirrors installed in the mobile body and a projected region projected on the mirrors,
    wherein the visually-recognized-region calculator makes the projected region of the mirrors the visually-recognized region of the driver when the line-of-sight direction of the driver is included in the installation position of the mirrors recorded by the mirror manager.

3. The recognized-region estimation device according to claim 1, comprising:
    a surrounding situation monitor to monitor surroundings of the mobile body and measuring information affecting a visually-recognizing state of the driver,
    wherein the visually-recognized-region calculator adjusts a weight of a degree of recognition in the visually-recognized region on the basis of a measured result of the surrounding situation monitor.

4. The recognized-region estimation device according to claim 1, comprising:
    a surrounding situation monitor to monitor surroundings of the mobile body in the mobile body coordinate system and detecting an obstacle,
    wherein the visually-recognized-region calculator calculates a blind corner region that is a blind corner by the obstacle detected by the surrounding situation monitor, and eliminates the blind corner region from the visually-recognized region of the driver.

5. The recognized-region estimation device according to claim 1,
    wherein the visually-recognized-region calculator simulates a visually-recognized region when a visually-recognized region in a three-dimensional space is projected on a two-dimensional plane.

6. The recognized-region estimation device according to claim 1,
    wherein the recognized-region calculator adds probability indicating a degree of recognition within the recognized region and probability indicating a degree of recognition within the visually-recognized region.

7. The recognized-region estimation device according to claim 1, comprising:
a virtual locus calculator to estimate a line-of-sight direction at time after current time,
wherein the visually-recognized-region calculator calculates a visually-recognized region at time after the current time on a basis of the line-of-sight direction estimated by the virtual locus calculator.

8. The recognized-region estimation device according to claim 1, comprising:
a virtual locus calculator to estimate a movement amount of the mobile body at time after current time,
wherein the recognized-region calculator calculates a recognized region at time after the current time on a basis of the movement amount estimated by the virtual locus calculator.

9. The recognized-region estimation device according to claim 1, comprising:
a surrounding situation monitor to monitor surroundings of the mobile body in the mobile body coordinate system and determining a degree of hazard of the mobile body; and
a driving state determiner to determine a driving state of the mobile body using the degree of hazard determined by the surrounding situation monitor and the recognized region calculated by e recognized-region calculator.

10. The recognized-region estimation device according to claim 1, comprising:
a map information manager to determine a degree of hazard of the mobile body in the mobile body coordinate system using map information; and
a driving state determiner to determine a driving state of the mobile body using the degree of hazard determined by the map information manager and the recognized region calculated by the recognized-region calculator.

11. The recognized-region estimation device according to claim 1, wherein the line-of-sight direction of the driver is received from a line-of-sight direction measurer.

12. The recognized-region estimation device according to claim 11, wherein the line-of-sight measurer is an element includes one or more sensors.

13. A recognized-region estimation method comprising:
a step of calculating, by a visually-recognized-region calculator, a visually-recognized region visually recognized by a driver of a mobile body in a mobile body coordinate system based on the mobile body on a basis of a received line-of-sight direction of the driver;
a step of calculating, by a recognized-region calculator, a recognized region recognized by the driver in the mobile body coordinate system on a basis of the visually-recognized region calculated by the visually-recognized-region calculator;
a step of measuring, by a movement amount measurer, a movement amount per unit time of the mobile body in the mobile body coordinate system; and
a step of moving, by the recognized-region calculator, the recognized region calculated prior to one unit time on a basis of the movement amount per unit time measured by the movement amount measurer, and updating, by the recognized-region calculator, the recognized region by adding the visually-recognized region calculated by the visually-recognized-region calculator to the moved recognized region.

14. The recognized-region estimation method according to claim 13, wherein the line-of-sight direction of the driver is received from a line-of-sight direction measurer.

15. The recognized-region estimation method according to claim 14, further comprising
causing the line-of-sight direction measurer to measure the line-of-sight direction of the driver.

16. A recognized-region estimation program stored in a non-transitory computer-readable recording medium, the program for allowing a computer to execute:
a visually-recognized-region calculating procedure of calculating a visually-recognized region visually recognized by a driver of a mobile body in a mobile body coordinate system based on the mobile body on a basis of a received line-of-sight direction of the driver;
a recognized-region estimating procedure of calculating a recognized region recognized by the driver in the mobile body coordinate system on a basis of the visually-recognized region calculated by the visually-recognized-region calculating procedure;
a procedure of measuring, by a movement amount measurer, a movement amount per unit time of the mobile body in the mobile body coordinate system; and
a procedure of moving, by a recognized-region calculator, the recognized region calculated prior to one unit time on a basis of the movement amount per unit time measured by the movement amount measurer, and updating, by the recognized-region calculator, the recognized region by adding the visually-recognized region calculated by the visually-recognized-region calculating procedure to the moved recognized region.

17. The recognized-region estimation program according to claim 16, wherein the line-of-sight direction of the driver is received from a line-of-sight direction measurer.

18. The recognized-region estimation program according to claim 17, wherein the program further includes a procedure of measuring, by the line-of-sight direction measurer, the line-of-sight direction of the driver.

* * * * *